United States Patent Office 3,550,259
Patented Dec. 29, 1970

3,550,259
NIPPLE OR NOZZLE BUILDUP BY THE ELECTROSLAG CONSUMABLE NOZZLE TECHNIQUE
Joseph W. Smith, Chattanooga, Tenn., assignor to Combustion Engineering, Inc., Windsor, Conn., a corporation of Delaware
Filed Apr. 4, 1968, Ser. No. 718,807
Int. Cl. B23k 19/00
U.S. Cl. 29—527.6      4 Claims

ABSTRACT OF THE DISCLOSURE

A method of providing nipples or nozzles on headers or drums by building up a metal deposit within a mold placed on the header or drum, the mold being in the general configuration of a nipple or nozzle. The weld metal is deposited within the mold by the electroslag consumable nozzle welding technique; and upon removal of the mold, the deposit is machined to its desired final shape.

BACKGROUND AND BRIEF DESCRIPTION

This invention is concerned with the production of nipples or nozzles and more particularly with the formation of nipples or nozzles on headers or drums by the electroslag consumable nozzle welding technique.

In the modern steam generating facility of today, there exists large complex tubing systems interconnecting numerous headers and drums. The manufacture of these headers and drums with their necessary nipples and nozzles for tubing connections has always presented unique problems in the industry. In the past, each individual nipple or nozzle had to be hand welded to a respective hole drilled through the header or drum to which attachment was desired. This procedure was not only difficult, but also costly and time consuming. Moreover, the immediate area at which the nipple or nozzle was joined to the header or drum was sensitive to cracking.

I have devised a new procedure for the formation of nipples or nozzles on headers or drums whereby the above objections are overcome. By use of the electroslag consumable nozzle welding technique, I propose depositing a weld metal buildup in a water cooled mold placed on the header or drum to which it is desired to join a nipple or nozzle. After the deposit is built up to the desired height, the mold is removed and the nipple or nozzle is machined to the desired final shape such as by drilling and chamfering. The union between the deposit and the device to which it is joined is so complete in electroslag welding of this type that cracking is virtually eliminated. Moreover, by use of this process, the nipples or nozzles may be closely spaced, since welding by hand is no longer required; and plural nipples or nozzles may be formed at one time rather than the one-at-a-time implacement of the past noted above.

BRIEF DESCRIPTION OF THE DRAWINGS

FIG. 3 is a view, partly in section, of apparatus necessary to carry out an alternative form of the process of this invention.

DETAILED DESCRIPTION OF THE PREFERRED EMBODIMENT

Figure 1:
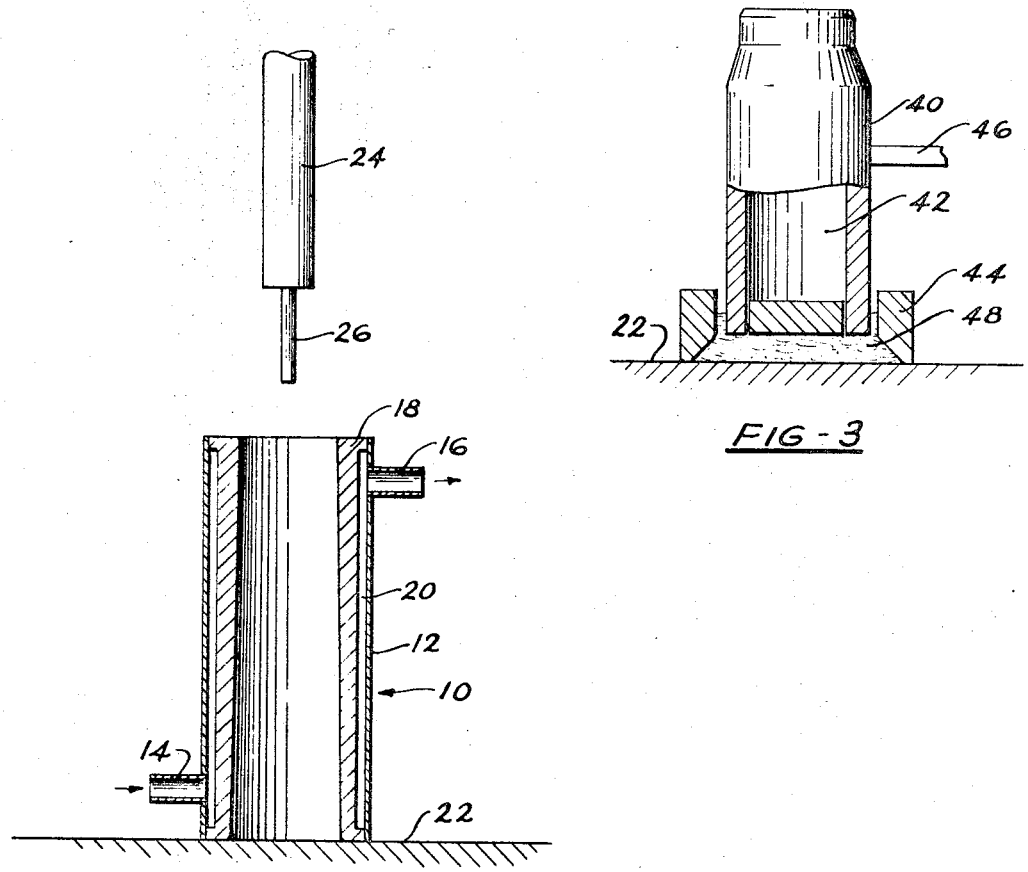
FIG. 1 is a view, partly in section, of the apparatus necessary to carry out the process of this invention.

Referring now to the drawings, FIG. 1 shows the water cooled mold generally designated 10 in which the desired nipple or nozzle is to be formed. The mold consists of an outer jacket 12 having a water inlet 14 and a water outlet 16. Within the outer jacket 12 is a copper molding element 18 having a cavity with a slight taper to facilitate removal of the mold after the weld metal deposit is complete. Between the outer jacket 12 and the copper molding element 18 is space 20 through which cooling water circulates. While a particular type of single cavity mold has been shown, as will be understood, any mold performing the same function may be used. Furthermore, by the use of this process any number of nipples or nozzles may be built up simultaneously by use of a mold with plural cavities.

The mold 10 is positioned on the device 22 (header or drum) upon which it is desired to form the nipple or nozzle, in the precise location where the nipple or nozzle is desired to be formed. A consumable welding nozzle 24 having a welding wire 26 protruding therefrom is passed down into the mold 10 in juxtaposition with device 22 so that a current passing therebetween will initially generate an arc. The heat generated by the initial arc will consume a portion of the consumable nozzle 24 and welding wire 26 to develop a pool of weld metal in the bottom of mold 10. Once the pool of weld metal is established, the nozzle 24 and welding wire 26 are submerged within the pool and depositing of weld metal takes place by resistance heating, and resultant melting, of the wire 26 and consumable nozzle 24. This, as will be understood, is the fundamental concept of metal deposit buildup by the electroslag consumable nozzle welding technique. The particular buildup within the mold 10 may be controlled by varying the speed of wire feed, using different fluxes, adding grain refining ingredients, or varying any other welding parameter as is well known.

Once the weld metal deposit reaches the approximate desired height, the mold may be removed and final machining may take place. Final machining may include drilling, chamfering, polishing or any other preparatory steps as may be required.

Figure 2:
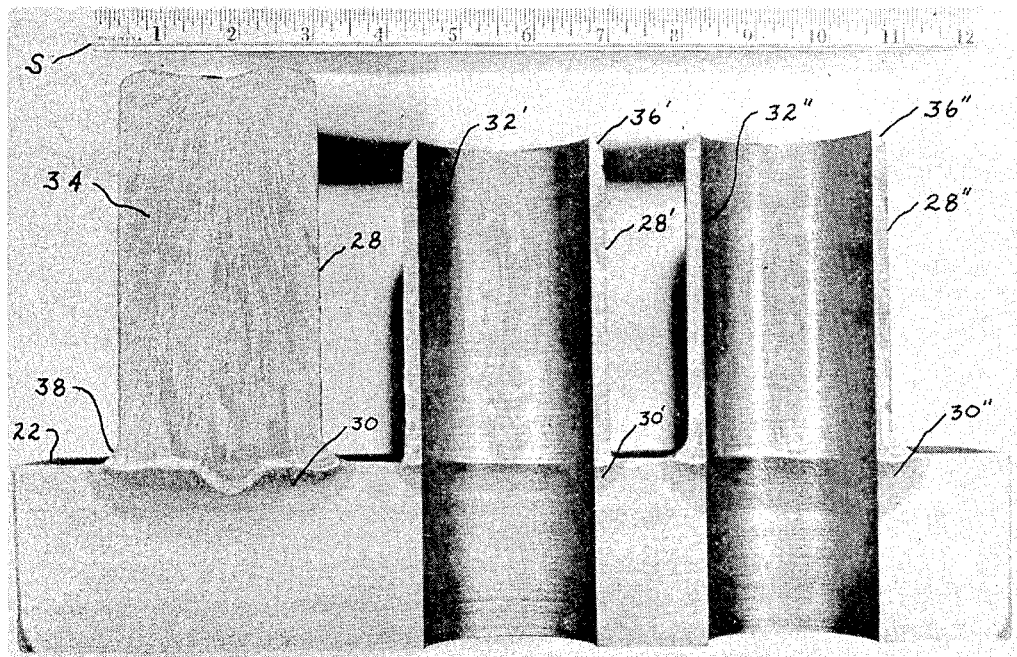
FIG. 2 is a metallographic cross-sectional view of three weld metal buildups formed by the process of this invention.

FIG. 2 is a photograph representative of typical weld metal deposits (28, 28', 28") built up in water cooled molds by the elctroslag consumable nozzle weld technique according to my invention and metallographically treated to show specific properties thereof as discussed hereinbelow. A scale S is shown to show the relative size of the buildups. Darkened areas 30, 30' and 30" at the union of the weld metal deposits and the device 22 to which they are affixed represent heat affected zones. As will be noted, areas 30' and 30" are almost entirely eliminated when the nipple or nozzle is drilled (as at 32', 32") in the finish machining operation.

The grain structure of the deposit 28 is shown as at cross section 34. The particular grain size and orientation may be altered by the addition of grain refining ingredients according to the characteristics of the nipple or nozzle desired, as noted above. Buildups 28' and 28" represent nozzles finished to the desired shape by drilling of the central passage 32', 32" and chamfering of the top external portion 36', 36". It will be noted that deposit 28' does not have a base fillet such as formed at portion 38 of deposit 28. The mold may, in fact, be made in any shape to give any desired basic nozzle or nipple configuration.

FIG. 3 shows an alternative form of carrying out the process of my invention. A generally preformed nozzle 40 having a central passage 42 is used in place of the consumable welding nozzle 24 and welding wire 26 of the previous embodiment. The nozzle is inserted in a copper mold 44 positioned on the device 22 to which the nozzle is to be attached. An electric current is sent by welding cable 46 to nozzle 40 to generate an arc between nozzle 40 and device 22 in order to form a slag pool 48 in the same manner as above. The nozzle 40 is inserted in the pool and partially consumed therein by the electroslag technique until the pool 48 reaches a desired height. At that time the nozzle is forced into the pool under pressure against the device 22 so as to secure the nozzle thereto as the molten area cools. This alternative procedure incorporates all the advantages of the above process and in addition markedly reduces the necessary final machining time.

As can be readily seen from the above description, I have devised a novel procedure for placing nipples or nozzles on headers or drums. With my unique process I am able to buildup simultaneously, by the electroslag consumable nozzle welding technique, nipples or nozzles controlling their overall shape, structure and number. Considerable time is saved over the prior method of individually hand welded nipple or nozzle formation, while at the same time there is provided a more secure union between the nipple or nozzle and the header or drum to which it is attached.

While I have illustrated and described two preferred embodiments of my invention, it is to be understood that such are merely illustrative and not restrictive and that variations and modifications may be made therein without departing from the spirit and scope of the invention. I therefore do not wish to be limited to the precise details set forth but desire to avail myself of such changes as fall within the purview of my invention.

I claim:

1. A method of forming nipples or nozzles on a device including the steps of placing a mold on the device upon which the nipple or nozzle is to be formed, building up at least one weld metal deposit in the mold by the electroslag consumable nozzle welding technique, and machining the built-up deposit to the desired final shape.

2. The method of claim 1 further including the step of liquid cooling the weld metal deposit forming mold.

3. The method of claim 1 wherein the machining includes the steps of drilling a passage through the weld metal deposit and that portion of the device to which the deposit is attached, and chamfering the external edge of said deposit forming said passage.

4. A method of joining nipples or nozzles on a device including the steps of placing a mold on the device upon which the nipple or nozzle is to be formed, building up at least one weld metal deposit in the mold by the electroslag consumable nozzle welding technique wherein a portion of a consumable electrode preformed in the shape of a nozzle or nipple is melted within the mold, and upon sufficient buildup forcing the remainder of the nozzle or nipple into the deposited portion under pressure so as to form a union therewith.

References Cited
UNITED STATES PATENTS

| | | | |
|---|---|---|---|
| 3,128,365 | 4/1964 | Schilberg | 219—76 |
| 3,211,887 | 10/1965 | Cotterman | 219—73X |
| 3,325,619 | 6/1967 | Tanenbaum | 219—73 |
| 3,337,712 | 8/1967 | Lucey | 219—73X |
| 3,433,926 | 3/1969 | Dick | 219—73X |

JOHN F. CAMPBELL, Primary Examiner

D. C. REILEY, Assistant Examiner

U.S. Cl. X.R.

29—401; 164—52; 219—73, 76